(12) United States Patent
Hasselgruber et al.

(10) Patent No.: US 6,955,388 B2
(45) Date of Patent: Oct. 18, 2005

(54) HARDTOP VEHICLE ROOF WITH RIGID ROOF PARTS

(75) Inventors: Andreas Hasselgruber, Eberdingen-Nussdorf (DE); Emil Schnell, Constance (DE); Wojciech Wezyk, Sindelfingen (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/866,503

(22) Filed: Jun. 12, 2004

(65) Prior Publication Data

US 2004/0222660 A1    Nov. 11, 2004

Related U.S. Application Data

(63) Continuation-in-part of application No. PCT/EP03/03385, filed on Apr. 1, 2003.

(30) Foreign Application Priority Data

Apr. 12, 2002    (DE) ................................ 102 16 431

(51) Int. Cl.⁷ ................................................ B60J 7/22
(52) U.S. Cl. ............... 296/108; 296/107.08; 296/180.1
(58) Field of Search .......................... 296/108, 107.08, 296/107.2, 180.1

(56) References Cited

U.S. PATENT DOCUMENTS

| 5,765,905 | A | * | 6/1998 | Hemmis et al. | .......... 296/180.1 |
| 6,431,636 | B1 | * | 8/2002 | Schutt | .................. 296/108 |
| 2002/0041108 | A1 | * | 4/2002 | Brettmann | ............... 296/180.1 |

FOREIGN PATENT DOCUMENTS

| DE | 196 46 240 | 5/1998 |
| DE | 197 52 068 | 5/1999 |
| DE | 199 13 033 | 10/2000 |
| DE | 100 32 378 | 1/2002 |

* cited by examiner

Primary Examiner—Jason Morrow
(74) Attorney, Agent, or Firm—Klaus J. Bach

(57) ABSTRACT

In a hardtop vehicle roof with at least two rigid roof parts arranged in a closed position in the longitudinal vehicle direction one behind another such that they cover an interior vehicle space and, in an open position, one of the roof sections extends upwardly behind the interior vehicle space so as to form a wind deflector while the other roof parts are disposed in a rear storage compartment, a trunk lid extends over the rear storage compartment in such a way that, with the roof opened, a gap is formed between the front end of the trunk lid and a front wall of the rear storage compartment through which the roof part forming the wind deflector projects upwardly behind the interior vehicle space.

5 Claims, 2 Drawing Sheets

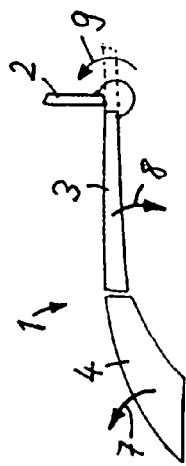
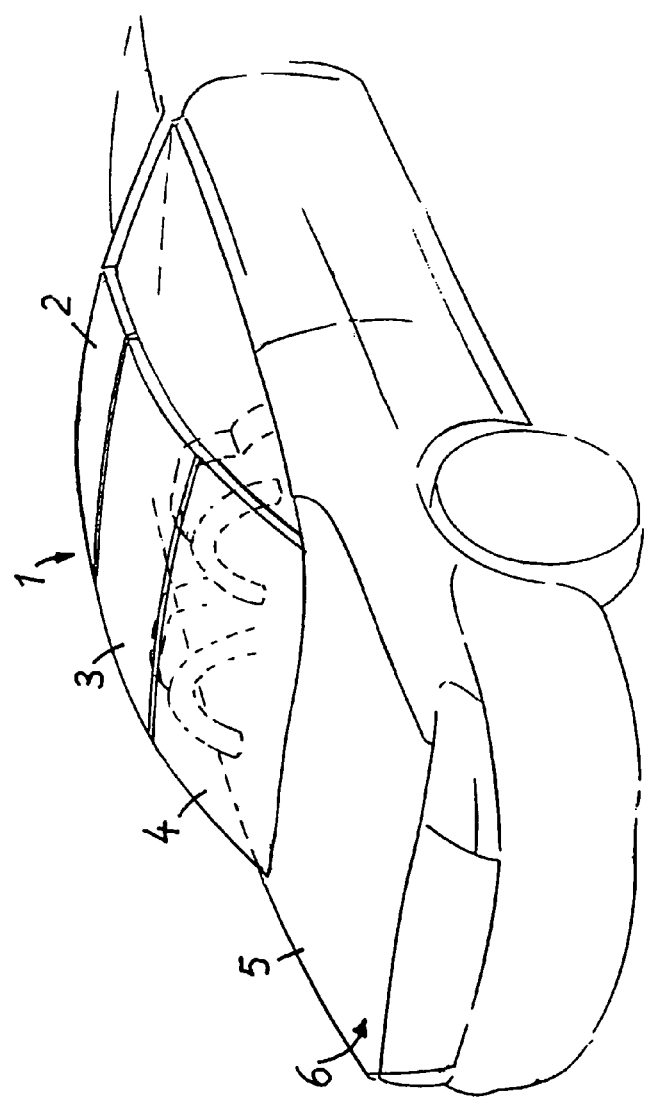

HARDTOP VEHICLE ROOF WITH RIGID ROOF PARTS

This is a continuation-in-part application of international application PCT/EP 03/03385 filed Apr. 1, 2003 and claiming the priority of German application 102 16 431.2 filed Apr. 12, 2002.

BACKGROUND OF THE INVENTION

The invention relates to a hardtop vehicle roof with at least two rigid roof parts which are arranged one after the other in the longitudinal vehicle direction and which are movable between a closed position, in which they cover an interior space of a vehicle, and a storage position in which one of the roof parts is deposited in a vertical orientation behind the seats of the vehicle so as to form a wind deflector and the other roof part is deposited in a rear storage compartment behind the vehicle interior.

Hardtop vehicle roofs used in convertible vehicles include generally two or three rigid roof parts which in a closed position are disposed adjacent one another so as to extend over an interior vehicle space and for opening the roof, can be transferred into a rear storage compartment. However, with the roof open, the passenger comfort is generally detrimentally affected because of air turbulence in the vehicle interior. For reducing this air turbulence, often a wind deflector is provided which is arranged behind the vehicle seats. It has often the form of an upright panel or a net. Such a wind deflector is described for example in DE 199 13 033 A1. The wind deflector of this publication is movable between an inoperative position, in which it is received in a storage compartment disposed in front of the trunk or in front of the storage compartment for the vehicle roof. However, this arrangement has the disadvantage that the movements of the vehicle roof and the movement of the wind deflector are not coupled. Rather the wind deflector must be operated independently of the vehicle roof and is usually operated by hand. A coupling between the movement of the vehicle roof and the wind deflector requires either a complicated operating mechanism or a separate drive motor for the wind deflector.

It is further disadvantageous that an additional space is needed for receiving the wind deflector whereby the trunk space available when the vehicle roof is closed as well as the volume of the storage compartment for receiving the vehicle roof is limited.

DE 100 32 378 C2 discloses a two-part hardtop vehicle roof with two vehicle roof parts which, in the storage position, are deposited in a rear roof storage compartment. The front roof part is in the storage position in a vertical orientation such that the front part of the front roof part extends beyond the contour of the vehicle and, in this way, forms a wind deflector.

It is the object of the present invention to provide a hardtop vehicle roof for a convertible vehicle with a wind deflector which is movable with simple means between its functional and non-functional positions. Furthermore, expediently, the trunk and/or the roof storage compartment should not be restricted by the wind deflector.

SUMMARY OF THE INVENTION

In a hardtop vehicle roof with at least two rigid roof parts arranged in the closed position in the longitudinal vehicle direction one behind another such that they cover an interior vehicle space and, in an open position, one of the roof sections extends upwardly behind the interior vehicle space so as to form a wind deflector while the other roof parts are disposed in a rear storage compartment, a trunk lid extends over the rear storage compartment in such a way that, with the roof opened, a gap is formed between the front end of the trunk lid and a front wall of the rear storage compartment through which the roof part forming the wind protector projects upwardly behind the interior vehicle space.

No separate wind deflector is needed with this arrangement. And no separate drive mechanism or expensive coupling with the drive mechanism for the opening and closing of the vehicle roof for the raising and the lowering of the wind deflector is needed since the rigid roof part automatically assumes its wind deflector position when the vehicle roof is moved into its storage position. Finally, also the available trunk space or of the roof storage compartment can be optimized since no delimiting components such as structures for receiving the wind deflector need to be provided and generally the wind deflector roof part is, in its wind-deflection position, partially or fully disposed outside the storage compartment and therefore does not restrict that area.

In an advantageous further embodiment of the invention, the roof part which forms the wind deflector when the vehicle roof is in its open position includes a section which is transparent. The transparent section may consist for example of polycarbonate or glass. In this way, in the raised position of the wind deflector, the transparent section permits a rear view from the vehicle mirror. In the closed position of the roof, the respective roof section forms a transparent roof section or a moon roof through which light can enter the vehicle interior.

The invention will become more readily apparent from the following description thereof on the basis of the accompanying drawings.

BRIEF DESCRIPTION OF THE DRAWINGS

FIG. 1 is a perspective view of a convertible vehicle with a three-part hardtop vehicle roof shown in the closed position, FIG. 2 is a schematic side view of the three-part vehicle roof with upwardly pivoted front roof part.

DESCRIPTION OF A PREFERRED EMBODIMENT

Figure 3:
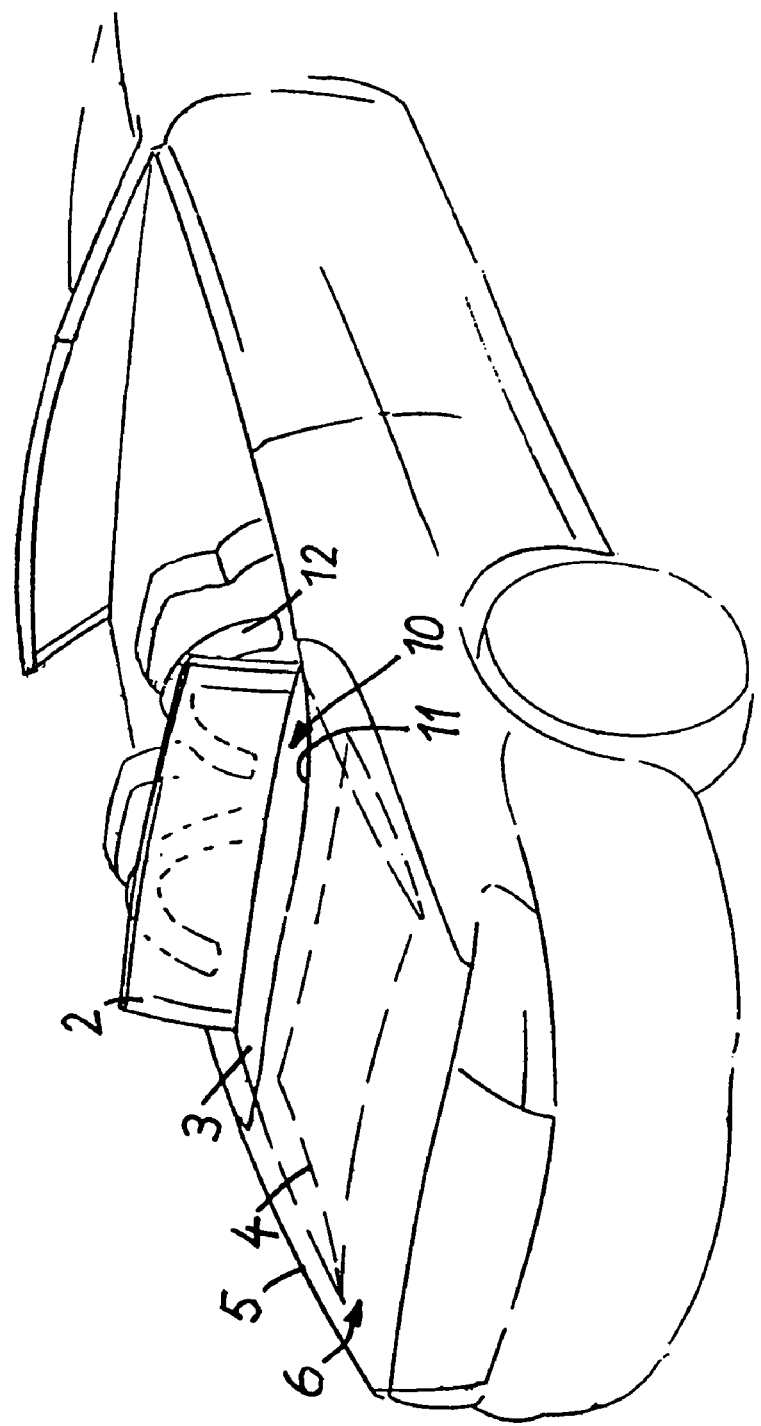
FIG. 3 is a perspective view of a convertible vehicle corresponding to FIG. 1, wherein however the hardtop vehicle roof is shown open and the front roof part is pivoted upwardly behind the vehicle seats into a wind-deflecting position.

The convertible vehicle as shown in FIG. 1 has a three-part roof 1 with a front roof part 2, an intermediate roof part 3 and a rear roof part 4, wherein the roof parts 2, 3 and 4 are each rigid components. In the closed position as shown in FIG. 1, the three roof parts 2, 3, and 4 are disposed one behind the other in the longitudinal vehicle direction. The front roof part 2 is disposed in the closed position of the vehicle roof adjacent a windshield frame and is connected thereto. The front roof part 2 is coupled kinematically to the intermediate roof part 3 such that it is pivotable relative thereto. The rear roof part 4 is kinematically connected to the vehicle body such that it can execute a pivot movement relative to the vehicle body.

In the open position, the vehicle roof is disposed in a storage compartment in the rear of the vehicle where a trunk lid 5 covers a trunk 6. In the embodiment shown, part of the trunk 6 also forms a storage compartment for receiving the vehicle roof in its storage position. Accordingly, the trunk lid 5 also assumes the function of a storage compartment cover. For the transfer of the vehicle roof 1 from the closed position to the storage position, the trunk lid is pivoted open so that the storage compartment below becomes accessible and the vehicle roof can be deposited. For closing the vehicle roof, the procedure is performed in the opposite direction.

From the side view of FIG. 2, it can be seen that the front roof part 2 can be transferred from a horizontal position in which the front roof part 2 and the intermediate roof part 3 are disposed essentially in a common plane, into an upwardly pivoted position as indicated by the arrow 9. In this position the plane of the front roof part 2 extends about vertically with respect to the plane of the intermediate roof part 3. By way of this upward pivoting of the front roof part 2 with respect to the intermediate roof part 3, the wind protection provided by the front roof part 2 as described with respect to the FIG. 3 can be achieved.

For the transfer of the vehicle roof 1 into the storage position, the rear roof part 4 is pivoted in the direction of the arrow 7 relative to the vehicle body backwardly into the storage compartment. At the same time, the intermediate roof part 3 is pivoted in the direction of the arrow 8 with respect to the rear roof part 4 in the opposite direction so that the inner surfaces of the intermediate roof part 3 and of the rear roof part 4 are disposed directly adjacent each other. The front roof part 2 is pivoted upwardly into an upright position in the direction of the arrow 9.

In the open, or respectively, storage position as shown in FIG. 3, the rear roof part 4 and the intermediate roof part 3 are deposited in the trunk 6; the trunk lid 5 is closed. In the storage position, the rear roof part 4 is disposed in the trunk 6 at the bottom with the outside surface thereof facing downwardly. The intermediate roof part 3 is disposed on top of the rear roof part 4 with the outside surface thereof facing upwardly. The front roof part 2 extends also in the storage position forwardly from the intermediate roof part 3.

Between the front edge 11 of the trunk lid 5 and a wall which delimits the trunk and forms the rear wall of the vehicle interior, there is an end gap 10, through which the front roof part 2 of the hardtop vehicle roof projects about vertically upwardly so as to provide for the wind deflector function. The width of the end gap 10 is expediently so selected that, in the closed position of the vehicle roof as shown in FIG. 1, the rear roof part 4 abuts the front edge 11 of the trunk lid 5. Because of the inclined position of the rear roof part 4, in the closed position of the vehicle roof, normally a somewhat larger end gap is needed than in the storage position in which the front roof part 2 extends essentially vertically upwardly. However, the design may also be such that in the closed position and in the storage position, the end gap is about the same for the rear roof part 4 and, respectively, the front roof part 2, so that in both positions, the end gap is filled completely by a roof part and, accordingly, a water-tight closure seal can be formed between the roof part and the trunk lid.

The front roof part 2 extends in the wind deflector position about to the same height as a rollover bar disposed in front of it and behind the vehicle seats. The front roof part 2 can be fully or partially transparent, particularly in the center section thereof and, for this purpose, may consist of glass or polycarbonate.

What is claimed is:

1. A hardtop vehicle roof with at least a front rigid roof part (2) and a rearwardly adjacent rigid roof part (3) which are arranged in a closed position of the roof (1) in the longitudinal vehicle direction one behind another such that they cover an interior vehicle space including vehicle seats and which are movable into a rear storage compartment (6) in which one roof part (2) extends vertically upwardly behind the vehicle seats such that said one roof part (2) forms a wind deflector while the other roof parts (3, 4) are disposed in said rear storage compartment (6) in a horizontal position, a trunk lid (5) extending over said rear storage compartment (6) for closing said rear storage compartment (6) in such a way that, with the roof in said open position, a gap (10) is formed between the front edge of said trunk lid (5) and a front wall of the rear storage compartment (6), said front roof part (2) which, in the closed position of the vehicle roof (1), is disposed directly adjacent a windshield frame being connected to the rearwardly adjacent roof part (3) so as to be pivotable upwardly relative thereto, and being pivoted upwardly so as to extend through the gap (10) thereby forming said wind deflector extending from the rearwardly adjacent rigid roof part (3) stored horizontally in said storage compartment (6) upwardly through said gap (10).

2. A hardtop vehicle roof according to claim 1, wherein said front roof part (2) forming said wind deflector is transparent at least in sections thereof.

3. A hardtop vehicle roof according to claim 2, wherein said transparent section of said roof part (2) consists of glass.

4. A hardtop vehicle roof according to claim 2, wherein said transparent section consists of polycarbonate.

5. A hardtop vehicle roof according to claim 1, wherein said vehicle roof (1) comprises three parts (2, 3, 4).

\* \* \* \* \*